(12) United States Patent
Wang

(10) Patent No.: US 11,582,661 B2
(45) Date of Patent: Feb. 14, 2023

(54) TERMINAL MEASUREMENT METHOD AND APPARATUS, AND TERMINAL

(71) Applicant: GUANGDONG OPPO MOBILE TELECOMMUNICATIONS CORP., LTD., Guangdong (CN)

(72) Inventor: Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/400,642

(22) Filed: Aug. 12, 2021

(65) Prior Publication Data

US 2021/0377829 A1 Dec. 2, 2021

Related U.S. Application Data

(63) Continuation of application No. PCT/CN2019/075200, filed on Feb. 15, 2019.

(51) Int. Cl.
*H04W 36/00* (2009.01)

(52) U.S. Cl.
CPC ... *H04W 36/0094* (2013.01); *H04W 36/0072* (2013.01); *H04W 36/0088* (2013.01); *H04W 36/00835* (2018.08); *H04W 36/00837* (2018.08); *H04W 36/0069* (2018.08)

(58) Field of Classification Search
CPC ............. H04W 24/10; H04W 36/0016; H04W 36/0058; H04W 36/0072; H04W 36/0083; H04W 36/00835; H04W 36/00837; H04W 36/0085; H04W 36/0088; H04W 36/0094;

(Continued)

(56) References Cited

U.S. PATENT DOCUMENTS

| | | | | |
|---|---|---|---|---|
| 2011/0294536 A1* | 12/2011 | Ryu | ...................... | H04W 36/385 455/525 |
| 2013/0084849 A1* | 4/2013 | Koskinen | .......... | H04W 36/0088 455/422.1 |
| 2015/0146595 A1 | 5/2015 | Jamadagni et al. | | |

(Continued)

FOREIGN PATENT DOCUMENTS

| CN | 102547881 A | 7/2012 |
|---|---|---|
| CN | 104350776 A | 2/2015 |

(Continued)

OTHER PUBLICATIONS

International Search Report in the international application No. PCT/CN2019/075200, dated Nov. 6, 2019.

(Continued)

*Primary Examiner* — Matthew W Genack
(74) *Attorney, Agent, or Firm* — Perkins Coie LLP

(57) ABSTRACT

The embodiments of the disclosure provide a measurement method and apparatus for a terminal, as well as a terminal. The measurement method includes that: a terminal acquires first indication information, the first indication information being for determining a measurement parameter of a dedicated measurement frequency, the measurement parameter of the dedicated measurement frequency being a first measurement parameter and/or a second measurement parameter, and the first measurement parameter being greater than the second measurement parameter.

14 Claims, 7 Drawing Sheets

(58) Field of Classification Search
CPC .............. H04W 36/30; H04W 72/085; H04W 72/1231
See application file for complete search history.

(56) References Cited

U.S. PATENT DOCUMENTS

| | | | |
|---|---|---|---|
| 2016/0255565 | A1 | 9/2016 | Kim et al. |
| 2018/0352513 | A1 | 12/2018 | Jamadagni et al. |
| 2019/0053087 | A1* | 2/2019 | Callender ............. H04W 24/10 |
| 2020/0120609 | A1 | 4/2020 | Jamadagni et al. |
| 2021/0105719 | A1* | 4/2021 | Thangarasa ....... H04W 52/0229 |

FOREIGN PATENT DOCUMENTS

| | | |
|---|---|---|
| CN | 105379324 A | 3/2016 |
| CN | 108738083 A | 11/2018 |
| CN | 108882293 A | 11/2018 |
| EP | 1565020 A1 | 8/2005 |
| JP | 2017118586 A | 6/2017 |
| JP | 2017535205 A | 11/2017 |
| WO | 2014153756 A1 | 10/2014 |

OTHER PUBLICATIONS

VIVO. "On UE Power Consumption Reduction in RRM Measurements", 3GPP TSG RAN WG1 Meeting #94bis, R1-1810415, Dec. 11, 2018 (Dec. 11, 2018).

3GPP TS 38.133 V16.8.0 (Jun. 2021),"NR; Requirements for support of radio resource management", Release 16.

3GPP TS 38.331 V16.4.1 (Mar. 2021), "NR;Radio Resource Control (RRC) protocol specification", (Release 16).

3GPP TSG-RAN WG4 Meeting # 70bis R4-141868, San Jose del Cabo, Mexico, Mar. 31-Apr. 4, 2014, Agenda Item: 7.9.3, Source: Ericsson, Title: RRM requirements for increased carrier monitoring in E-UTRA idle states, Document for: Discussion. 7 pages.

First Office Action of the Indian application No. 202117040887, dated Mar. 16, 2022. 5 pages with English translation.

Ir3GPP TSG-RAN WG4 Meeting # 71 R4-143189, Seoul, Korea, May 19-24, 2014, Agenda Item: 7.9.1, Source: Ericsson, Title: Increased UE carrier monitoring in idle mode, Document for: Discussion. 8 pages.

Supplementary European Search Report in the European application No. 19914876.8, dated Jan. 4, 2022. 12 pages.

Ericsson, "Priority signaling and UE capability for increased number of frequencies to monitor", 3GPP TSG RAN WG2 #86 R2-142118, Seoul, South Korea, May 19-23, 2014. 6 pages.

First Office Action of the Chinese application No. 202110918894.2, dated Sep. 9, 2022. 15 pages with English translation.

Intel Corporation, "Discussion on increasing the minimum number of carriers for UE monitoring in EUTRA RRC_IDLE state", 3GPP TSG-RAN WG4 Meeting #72 R4-145268, Dresden, Germany, Aug. 18-22, 2014. 3 pages.

First Office Action of the Japanese application No. 2021-547389, dated Dec. 23, 2022. 12 pages with English translation.

* cited by examiner

Aggregation of two frequency-disperse component carriers is 40 MHz total bandwidth Aggregation of five CCs is 100 MHz total bandwidth A terminal acquires first indication information, the first indication information being for determining a measurement parameter of a dedicated measurement frequency, the measurement parameter of the dedicated measurement frequency being a first measurement parameter and/or a second measurement parameter, and the first measurement parameter being greater than the first measurement parameter   801

FIG. 8

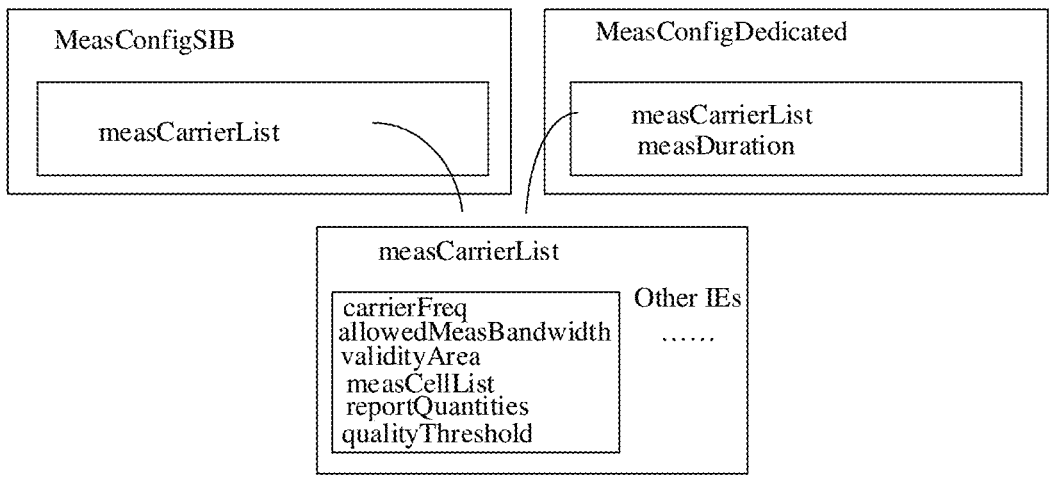

FIG. 9A

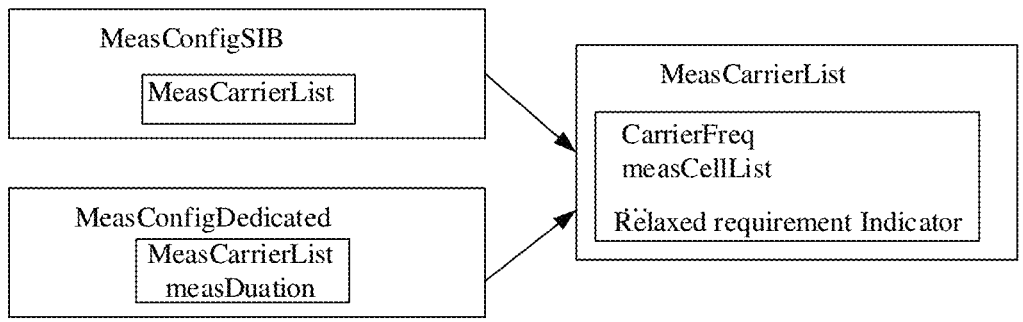

FIG. 9B

TERMINAL MEASUREMENT METHOD AND APPARATUS, AND TERMINAL

CROSS-REFERENCE TO RELATED APPLICATION

This is a continuation application of International Patent Application No. PCT/CN2019/075200 filed on Feb. 15, 2019, the content of which is herein incorporated by reference in its entirety.

TECHNICAL FIELD

Embodiments of the disclosure relate to the technical field of mobile communication, and particularly to a measurement method and apparatus for a terminal, and a terminal.

BACKGROUND

A terminal, after acquiring an idle-state or inactive-state related measurement configuration, may store the measurement configuration. The terminal may perform cell measurement based on the stored measurement configuration when entering an idle state or an inactive state. Then, the terminal may indicate existence of a measurement result to a network side through an uplink message, and report the measurement result based on a request of a base station.

When the terminal performs cell measurement, if the terminal evaluates based on a present measurement requirement, in continuous time that a cell selection preparation condition or a cell reselection preparation condition is not satisfied, the terminal may not refer to a present measurement criterion, and the terminal may measure all neighbor frequencies configured by a serving cell. On the other hand, for dedicated measurement frequencies configured by the terminal, if the terminal performs cell measurement according to the present measurement requirement, measurement for the dedicated measurement frequencies may not be started after the dedicated measurement frequencies are detected, and detection of the dedicated measurement frequencies may cause additional power consumption of the terminal.

SUMMARY

The embodiments of the disclosure provide a measurement method for a terminal, which may include that: a terminal acquires first indication information, the first indication information being for determining a measurement parameter of a dedicated measurement frequency, the measurement parameter of the dedicated measurement frequency being a first measurement parameter and/or a second measurement parameter, and the first measurement parameter being greater than the second measurement parameter.

The embodiments of the disclosure provide a measurement method for a network device, which may include that: a network device sends first indication information to the terminal. The first indication information is configured to determine a measurement parameter of a dedicated measurement frequency, the measurement parameter of the dedicated measurement frequency is a first measurement parameter and/or a second measurement parameter, and the first measurement parameter is greater than the second measurement parameter.

The embodiments of the disclosure provide a network device, which may include a transceiver configured to send first indication information to the terminal. The first indication information is configured to determine a measurement parameter of a dedicated measurement frequency, the measurement parameter of the dedicated measurement frequency is a first measurement parameter and/or a second measurement parameter, and the first measurement parameter is greater than the second measurement parameter.

The embodiments of the disclosure provide a computer program, which may run in a computer to cause the computer to execute the measurement method for a terminal.

Based on the technical solutions, different measurement parameters are used for dedicated frequencies or bands on the premise of not changing a present measurement criterion for a terminal, to reduce the number of times of dedicated measurement of the terminal over this part to reduce the power consumption of the terminal, and meanwhile, to provide neighboring-cell measurement results required by rapid configuration of carrier aggregation and dual connectivity (DC) for a network side.

BRIEF DESCRIPTION OF THE DRAWINGS

The drawings described herein are adopted to provide a further understanding to the disclosure and form a part of the disclosure. Schematic embodiments of the disclosure and descriptions thereof are adopted to explain the disclosure and not intended to form improper limits to the disclosure. In the drawings:

FIG. 8 is a first flowchart of a measurement method for a terminal according to an embodiment of the disclosure;

FIG. 9A is a first schematic diagram of measurement configuration information according to an embodiment of the disclosure;

FIG. 9B is a second schematic diagram of measurement configuration information according to an embodiment of the disclosure;

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5th-Generation (5G) system.

Figure 1:
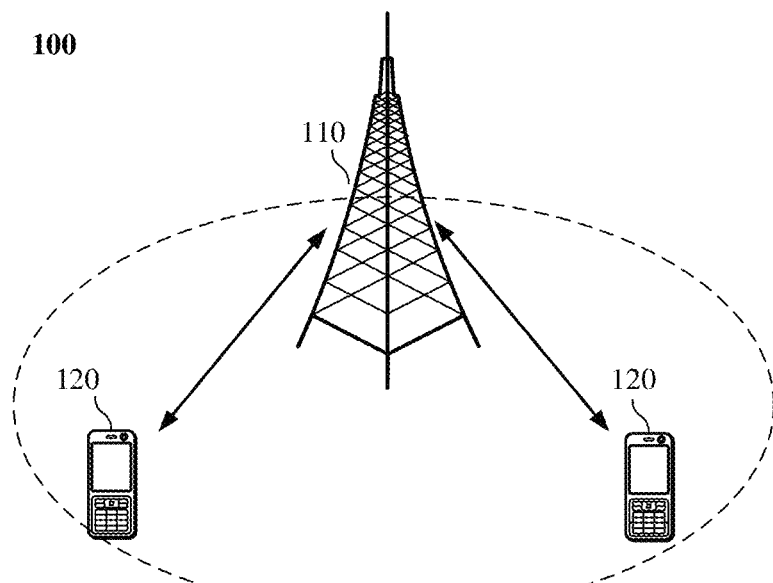
FIG. 1 is a schematic diagram of an architecture of a communication system according to an embodiment of the disclosure.

Exemplarily, a communication system 100 that the embodiments of the disclosure are applied to is shown in FIG. 1. The communication system 100 may include a network device 110, and the network device 110 may be a device communicating with a terminal 120 (or called a communication terminal and a terminal). The network device 110 may provide communication coverage for a specific geographical region and may communicate with a terminal located in the coverage. Optionally, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a mobile switching center, a relay station, an access point, a vehicle device, a wearable device, a hub, a switch, a network bridge, a router, a network-side device in a future 5G network, a network device in a future evolved Public Land Mobile Network (PLMN), etc.

The communication system 100 further includes at least one terminal 120 within the coverage of the network device 110. The "terminal" used herein includes, but not limited to, a device configured to receive/send a communication signal through a wired line connection, for example, through Public Switched Telephone Network (PSTN), Digital Subscriber Line (DSL), digital cable and direct cable connections, and/or another data connection/network) and/or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or another terminal, and/or an Internet of Things (IoT) device. The terminal configured to communicate through a wireless interface may be called a "wireless communication terminal", a "wireless terminal" or a "mobile terminal." Examples of the mobile terminal include, but not limited to, a satellite or cellular telephone, a Personal Communication System (PCS) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal may refer to an access terminal, UE, a user unit, a user station, a mobile station, a mobile radio station, a remote station, a remote terminal, a mobile device, a user terminal, a terminal, a wireless communication device, a user agent, or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal in the 5G network, a terminal in the future evolved PLMN or the like.

Optionally, Device to Device (D2D) communication may be performed between the terminals 120.

Optionally, the 5G system or the 5G network may also be called an NR system or an NR network.

A network device and two terminals are exemplarily shown in FIG. 1. Optionally, the communication system 100 may include multiple network devices and another number of terminals may be included in coverage of each network device. No limits are made thereto in the embodiments of the disclosure.

Optionally, the communication system 100 may further include another network entity such as a network controller and a mobility management entity. No limits are made thereto in the embodiments of the disclosure.

It is to be understood that a device with a communication function in the network/system in the embodiments of the disclosure may be called a communication device. For example, for the communication system 100 shown in FIG. 1, communication devices may include the network device 110 and terminal 120 with the communication function, and the network device 110 and the terminal 120 may be the specific devices mentioned above and will not be elaborated herein. The communication devices may further include other devices in the communication system 100, for example, other network entities like a network controller and a mobility management entity. No limits are made thereto in the embodiments of the disclosure.

It should be understood that terms "system" and "network" in the disclosure may usually be interchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "I" in the disclosure usually represents that previous and next associated objects form an "or" relationship.

For conveniently understanding the technical solutions of the embodiments of the disclosure, related technologies of the embodiments of the disclosure will be described below. Any combination of the following related technologies and the technical solutions of the embodiments of the disclosure falls within the scope of protection of the embodiments of the disclosure.

With the pursuit of people for rate, delay, high-speed mobility, and efficiency, and diversification and complication of services in the future life, the international standard organization 3rd Generation Partnership Project (3GPP) has started researching and developing 5G. Main application scenarios of 5G are enhanced Mobile Broadband (eMBB), Ultra-Reliable Low-latency Communications (URLLC) and massive Machine-Type Communications (mMTC).

On one hand, eMBB still aims to enable a user to obtain a multimedia content, service and data. Demands in eMBB increase rapidly. On the other hand, since eMBB may be deployed in different scenarios, for example, a room, an urban area, and a rural area, and capabilities and demands thereof are also greatly different, different processing may be performed in different cases, and detailed analysis is required to be made in combination with specific deployment scenarios. Typical applications of URLLC include industrial automation, power automation, remote medical operation (surgical operation), traffic safety guarantee, etc. Typical characteristics of mMTC include high connection density, small data volume, delay-insensitive services, low cost and long service life of modules, etc.

For purposes of reducing radio signaling, rapidly resuming wireless connections and rapidly resuming data services, a new RRC state, i.e., an RRC_INACTIVE state, is defined in 5G. This state is different from an RRC idle (RRC_IDLE) state and an RRC active (RRC_ACTIVE) state, specifically, 1) The RRC_IDLE state (called an idle state for short): mobility is based on cell selection and reselection of UE, paging is initiated by a Core Network (CN), and a paging area is configured by the CN. There is no UE context and RRC connection on a base station side.

2) An RRC_CONNECTED state (called a connected state for short): there is an RRC connection, and there is a UE context on a base station side and a UE side. A network side knows that a location of the UE is of a specific cell level. Mobility is controlled by the network side. Unicast data may be transmitted between the UE and the base station.

3) The RRC_INACTIVE state (called an inactive state for short): mobility is based on cell selection and reselection of UE, there is a CN-NR connection, a UE context exists in a base station, paging is triggered by a RAN, a RAN-based paging area is managed by the RAN, and the network side knows that the location of the UE is of a RAN-based paging area level.

Figure 2:
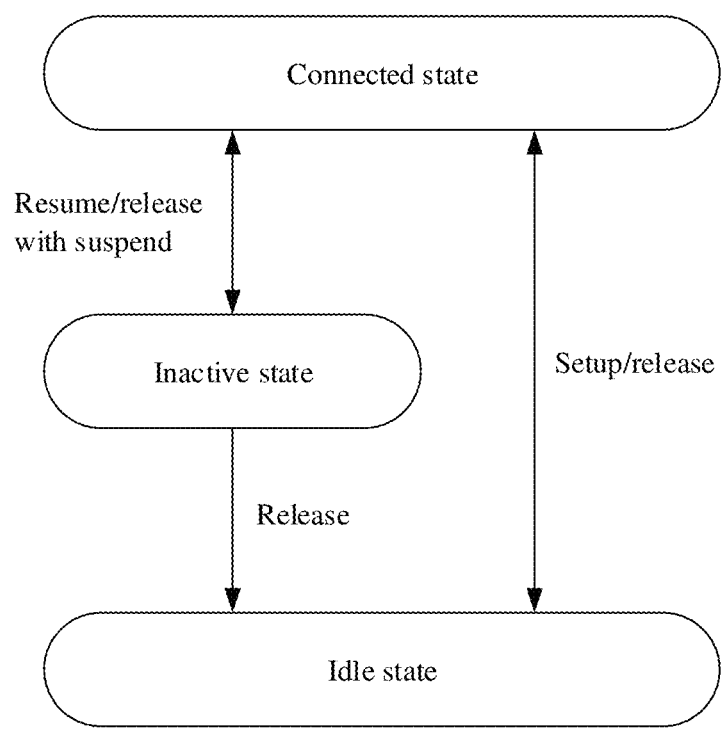
FIG. 2 is a schematic diagram of a Radio Resource Control (RRC) state switching according to an embodiment of the disclosure.

The network side may control RRC state switching of the UE, as shown in FIG. 2, specifically as follows.

1) The RRC_CONNECTED State and the RRC_INACTIVE State

On one hand, the network side may release and suspend the RRC connection to control the UE to be switched from the RRC_CONNECTED state to the RRC_INACTIVE state.

On the other hand, the network side may resume the RRC connection to control the UE to be switched from the RRC_INACTIVE state to the RRC_CONNECTED state.

2) The RRC_CONNECTED State and the RRC_IDLE State

On one hand, the network side may release the RRC connection to control the UE to be switched from the RRC_CONNECTED state to the RRC_IDLE state.

On the other hand, the network side may establish the RRC connection to control the UE to be switched from the RRC_IDLE state to the RRC_CONNECTED state.

3) The RRC_INACTIVE State and the RRC_IDLE State

The network side may release the RRC connection to control the UE to be switched from the RRC_INACTIVE state to the RRC_IDLE state.

When the UE is in the RRC_INACTIVE state, the UE may be triggered by any one of the following events to be switched back to the RRC_IDLE state automatically:

a CN initiated paging message is received;

when an RRC resume request is initiated, a timer T319 is started, and the timer T319 expires;

Message 4 (MSG4) integrity protection verification fails;

cell reselection to another Radio Access Technology (RAT) is performed; and a camp on any cell state is entered.

The UE has the following features when in the RRC_INACTIVE state:

a connection between the RAN and the CN is kept;

an Access Stratum (AS) context is stored in the UE and at least one base station;

the UE is reachable for the RAN side, and a related parameter is configured by the RAN;

the network side is not required to be notified when the UE moves in an RNA configured by the RAN, but the network side is required to be notified when the UE moves out of the RNA; and the UE moves in the RNA in a cell selection and reselection manner.

When the UE is in the RRC_INACTIVE state, the network side may configure a parameter of the RRC_INACTIVE state for the UE through RRC release dedicated signaling. The parameter mainly includes: an Inactive-Radio Network Temporary Identifier (I-RNTI), configured to identify a context, corresponding to the inactive state, of the UE on the base station side, the I-RNTI being unique in the base station; the RNA, configured to control an area for cell selection and reselection of the UE in the inactive state, i.e., a paging area for RAN initiated paging; an RAN Discontinuous Reception (DRX) cycle, configured to calculate a paging occasion for RAN initiated paging; a RNA Update (RNAU) periodicity, configured to control a periodicity for execution of periodic RAN location update by the UE; and a Network Color Code (NCC), configured for a key used in an RRC connection resume process.

Figure 3:
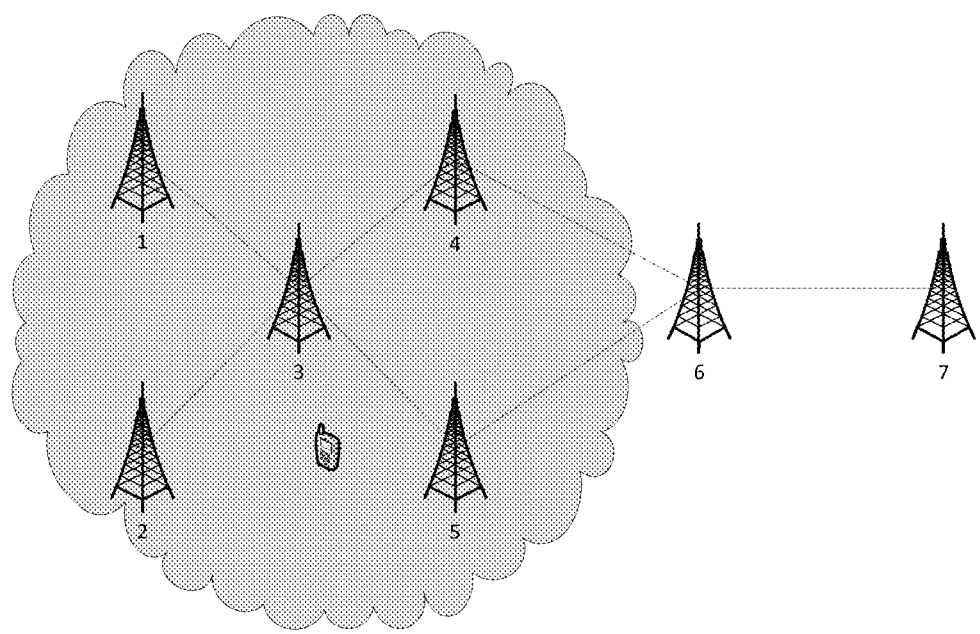
FIG. 3 is a schematic diagram of a Radio Access Network (RAN) Notification Area (RNA) of User Equipment (UE) in an RRC_INACTIVE state according to an embodiment of the disclosure.

FIG. 3 is a schematic diagram of an RNA when UE is in an RRC_INACTIVE state. A cell range covered by base station 1 to base station 5 is the RNA. When the UE moves in the RNA, the network side is not required to be notified, and a mobility behavior, i.e., a cell selection and reselection principle, in the idle state, is followed. When the UE moves out of a paging area configured by the RAN, the UE may be triggered to resume the RRC connection and re-acquire an paging area configured by the RAN. When downlink data arrives at the UE, a gNB that keeps the connection between the RAN and the CN for the UE may trigger all cells in the RAN paging area to send paging messages to the UE such that the UE in the inactive state may resume the RRC connection for data reception. The RAN paging area is configured for the UE in the inactive state. For ensuring the reachability of the UE in this area, the UE is required to perform periodic location update based on the periodicity configured by the network.

Therefore, when the UE enters the connected state from the inactive state, there are three conditions:

First condition is that: downlink data arrives at the UE, and the network side initiates RAN initiated paging to cause the UE to enter the connected state;

Second condition is that: the UE initiates RAN location area update, for example, periodic RAN location update or cross-area location update; and Third condition is that: the UE has an uplink data sending requirement and thus the UE is caused to enter the connected state.

Neighboring-cell measurement behaviors of the UE in the idle state and the inactive state are restricted by related parameters in a system broadcast message. For example:

for starting of intra-frequency measurement, intra-frequency neighboring-cell measurement is not started when Srxlev of a serving cell is greater than SIntraSearchP and Squal of the serving cell is greater than SIntraSearchQ, otherwise intra-frequency neighboring-cell measurement is started.

Equivalent-priority or low-priority inter-frequency neighboring-cell measurement is not started when Srxlev of the serving cell is greater than SIntraSearchP and Squal of the serving cell is greater than SIntraSearchQ, otherwise is started.

For high-priority inter-frequency measurement, measurement is started in any case.

Figure 4A:
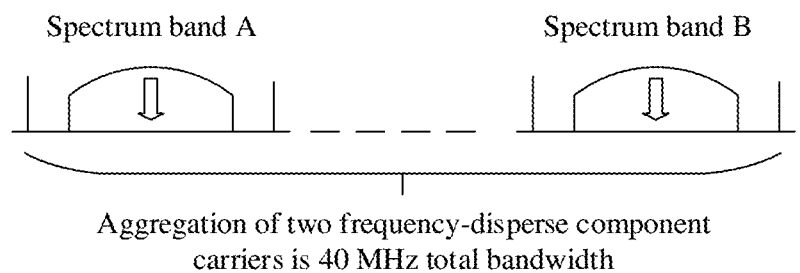
FIG. 4A is a schematic diagram of discontinuous CA according to an embodiment of the disclosure.
Figure 4B:
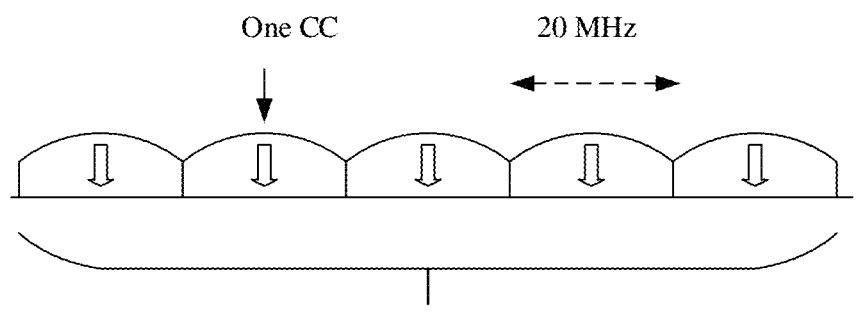
FIG. 4B is a schematic diagram of continuous CA according to an embodiment of the disclosure.

For meeting the requirement on high rate, 5G also supports a carrier aggregation (CA) technology. CA refers to jointly scheduling and using resources on multiple Component Carriers (CCs) such that an NR system may support a greater bandwidth and may achieve a higher system peak rate. CA may be classified into continuous CA and discontinuous CA based on the continuity of aggregated carriers on spectrums. FIG. 4A is a schematic diagram of discontinuous CA. FIG. 4B is a schematic diagram of continuous CA. CA may be classified into intra-band CA and inter-band CA based on whether bands where aggregated carriers are located are the same.

In CA, there is one and only one Primary Cell Component (PCC), and the PCC provides an RRC signaling connection, a Non-Access Stratum (NAS) function, security, etc. A Physical Uplink Control Channel (PUCCH) exists on the PCC and only on the PCC. In CA, there may be one or more Secondary Cell Components (SCCs), and the SCC only provides an additional radio resource. Both the PCC and the SCC are called serving cells. A cell on the PCC is a Primary Cell (Pcell), and a cell on the SCC is a Secondary Cell (Scell). It is also specified in a standard that at most five carriers are supported to be aggregated, namely a bandwidth after aggregation is maximally 100MHZ, and the aggregated carriers belong to the same base station. All the aggregated carriers use the same Cell Radio Network Temporary Identifier (C-RNTI), and the base station ensures that the C-RNTI does not conflict in cells where each carrier is located. Since asymmetric CA and symmetric CA are supported, aggregated carriers are required to include downlink carriers, and may include no uplink carriers. Moreover, a primary carrier cell is required to have its own Physical Downlink Control Channel (PDCCH) and PUCCH, only the primary carrier cell has the PUCCH, and another secondary carrier cell may have a PDCCH.

An Scell is configured through RRC dedicated signaling, an initially configured state is an inactive state, and no data can be sent and received in this state. The Scell may be activated through a Media Access Control Control Element (MAC CE) to send and receive data. From the prospective of a delay of configuration and activation of the Scell, this architecture is not the best. This delay reduces the efficiency of use of CA and radio resources, particularly for a small cell deployment scenario. In a dense small cell deployment scenario, a signaling load of each Scell is high, particularly under the condition that each Scell is required to be configured independently. Therefore, an additional delay is introduced to the present CA architecture, use of CA is restricted, and the load sharing gain of CA is reduced.

Therefore, CA is optimized in LTE Release 15 (R15). The following main functions are optimized.

UE measurements during IDLE mode: an idle-state measurement configuration (the measurement configuration is a dedicated measurement configuration) may be configured in an RRC release message (the RRC release message is RRC dedicated signaling), and an idle-state measurement configuration may also be configured in a system broadcast System Information Block 5 (SIB5). The UE uses the dedicated measurement configuration when having the dedicated measurement configuration, otherwise uses the measurement configuration in SIB5. Here, the measurement configuration in SIB5 has no validity duration limits, and when the dedicated measurement configuration is configured in the RRC dedicated signaling, a validity duration of the dedicated measurement configuration is also configured, i.e., T331 (measIdleDuration). When T331 expires or stops, the measurement configuration configured in the dedicated signaling is released, and whether the UE continues to use the measurement configuration in SIB5 is determined by implementation of the UE.

After the UE acquires the idle-state measurement configuration (called an idle measurement configuration for short), the UE may execute measurement, indicate existence of an idle-state measurement result (called an idle measurement result for short) to the network side through an uplink message, and then report the idle-state measurement result based on a request of the base station. Meanwhile, a cell may also broadcast in SIB2 whether reporting of the idle measurement result is supported.

Figure 5:
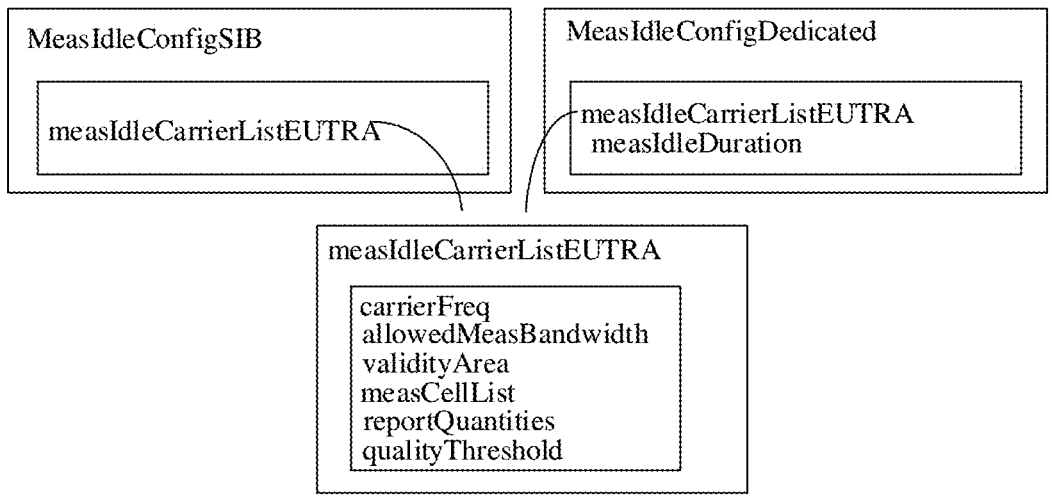
FIG. 5 is a schematic diagram of idle measurement configurations according to an embodiment of the disclosure.

The idle measurement configurations are as shown in FIG. 5. The idle measurement configuration (MeasIdleConfigSIB) in the system broadcast SIB5 includes a carrier list (measIdleCarrierListEUTRA), and the idle measurement configuration in the RRC dedicated signaling includes the carrier list (measIdleCarrierListEUTRA) and the validity duration (measIdleDuration). Furthermore, measIdleCarrierListEUTRA includes carrierFreq, allowedMeasBandwidth, validityArea, reportQuantities, and qualityThreshold. carrierFreq and allowedMeasBandwidth indicate a measurement frequency and a measurement bandwidth, and validityArea indicates a validity range of the idle measurement configuration, and is a cell list. In response to the UE reselecting a cell outside the validityArea, the timer T331 stops. The measCellList presents cells reported by the measurement configuration, and other cells are not needed to be reported. If the measCellList is not configured, the UE may report measurements of maxCellMeasIdle cells meeting qualityThreshold. Reported measurements are specified by reportQuantities.

Dormant Scell state: a state of a Scell may be classified into the active state and the inactive state. For resuming the cell rapidly, a new cell state is defined, i.e., a dormant state. In the dormant state, the UE may perform measurement and report a Channel Quality Indicator (CQI) and/or a Radio Resource Management (RRM) measurement result, but does not decode a PDCCH. Meanwhile, a new MAC CE is defined to control dormant state switching. Specifically, switching between the active state and the dormant state may be controlled through the newly defined MAC CE. The MAC CE indicates the dormant state when set to 1, and indicates the active state when set to 0.

Direct Scell state configuration: the state of the Scell may be set as the active state or the dormant state through RRC signaling, and may be set as the inactive state by default.

Short CQI reporting: the Scell is in the active state, and another short CQI reporting period may be configured for the UE to allow the UE to rapidly indicate the CQI after the Scell is activated. The UE is switched to a present CQI configuration after a certain period of time.

Common Scell configuration: an Scell group is defined to provide common configuration information for the UE to optimize signaling. A dedicated configuration parameter of each Scell may cover the parameter in the common configuration information.

During early deployment of NR, it is difficult to implement complete NR coverage, and thus typical network coverage includes wide area LTE coverage and NR island coverage. Moreover, LTE is mostly deployed below 6 GHz, and there are few spectrums for 5G below 6 GHz, so researches on application of spectrums above 6 GHz for NR are required. However, a high band is limited in coverage and fast in signal fading. Meanwhile, for protecting early LTE investment of a mobile service provider, a working mode of tight interworking between LTE and NR is proposed.

Figure 6:
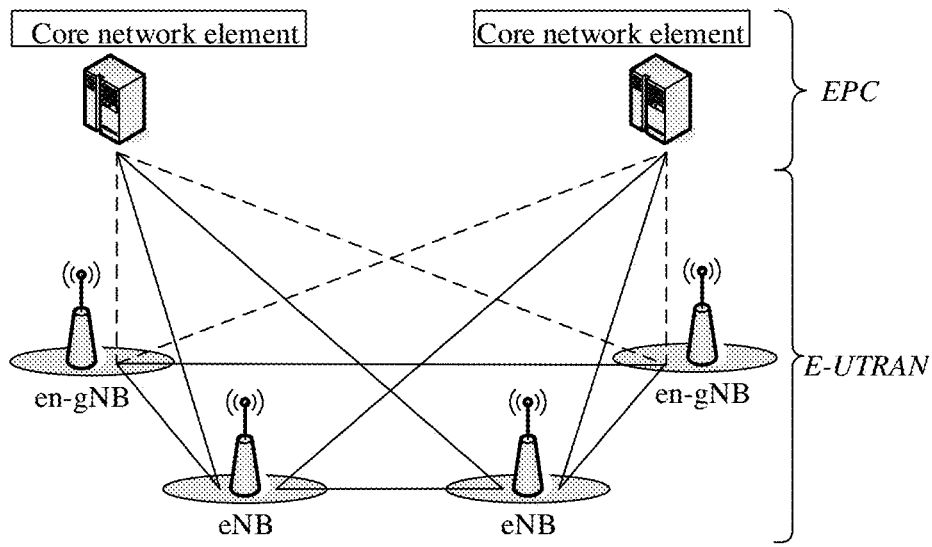
FIG. 6 is a network deployment and networking architecture diagram of Evolved Universal Mobile Telecommunication System (UMTS) Terrestrial Radio Access Network (E-UTRAN)-New Radio (NR) DC (EN-DC) according to an embodiment of the disclosure.

For implementing deployment and commercial application of 5G networks as soon as possible, the 3GPP completed the first 5G release, i.e., EN-DC (LTE-NR DC), before the end of December, 2017. In EN-DC, an LTE base station (eNB) serves as a Master Node (MN), and an NR base station (gNB or en-gNB) serves as a Secondary Node (SN). A network deployment and networking architecture of EN-DC is as shown in FIG. 6. E-UTRAN represents an access network part, and Evolved Packet Core (EPC) represents a CN part. The access network part consists of at least one eNB (at least two eNBs are shown in FIG. 6) and at least one en-gNB (at least two en-gNBs are shown in FIG. 6). The eNB serves as an MN, the en-gNB serves as an SN, and both the MN and the SN are connected to the EPC. In later R15, other DC modes are supported, i.e., NR-E-UTRAN (NE)-DC, 5G Core (5GC)-EN-DC, and NR DC. For EN-DC, a CN connected with an access network is an EPC, and a CN connected in another DC mode is a 5GC.

For both configuration of CA and configuration of DC, a configuration and activation delay of an Scell and a configuration and activation delay of a Secondary Cell Group (SCG) are required to be reduced to satisfy the improvement of the cell capacity particularly in the small cell deployment scenario.

Due to the mobility of UE in an idle state in a Standalone (SA) mode, measurement requirements for cell reselection are divided into the following according to a relationship between a measurement frequency and a frequency of a serving cell:

Measurement and evaluation of serving cell;
Measurements of intra-frequency cells;
Measurements of inter-frequency cells; and
Measurements of inter-RAT cells.

Figure 7:
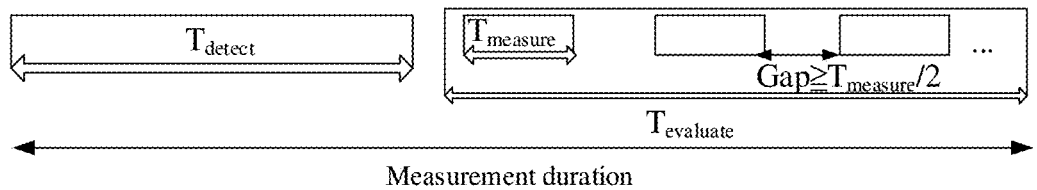
FIG. 7 is a schematic diagram of a measurement parameter according to an embodiment of the disclosure.

Measurement of UE involves three measurement parameters, i.e., detection duration (Tdetect), measurement duration (Tmeasure), and evaluation duration (Tevaluate) respectively. Definitions about Tdetect, Tmeasure, and Tevaluate are as shown in FIG. 7. Intra-frequency measurement is taken as an example, and other types of measurement are similar to intra-frequency measurement.

1) The UE identifies new intra-frequency cells, and measures Synchronization Signal-Reference Signal Received Power (SS-RSRP) and Synchronization Signal-Reference Signal Received Quality (SS-RSRQ) of a dedicated frequency.

2) The UE evaluates whether a newly detectable intra-frequency cell satisfies a cell reselection criterion, the detection duration being Tdetect.

3) The UE measures SS-RSRP and SS-RSRQ of intra-frequency cells according to the measurement criterion, the measurement duration being Tmeasure.

4) For an intra-frequency cell that is detected but not reselected, the UE should evaluate measurement data of the cell in Tevaluate for filtering.

5) The UE filters SS-RSRP and SS-RSRQ of each measured intra-frequency cell (at least two groups). The at least two groups should be measured at an interval of at least Tmeasure/2.

6) If the serving cell instructs (in measurement control system information) the UE that performs cell reselection not to perform neighboring-cell measurement, the UE does not consider frequency measurement for a neighboring cell.

When the UE in the idle state or the inactive state evaluates, in a plurality of continuous DRX cycles according to the present measurement requirement, that a cell selection preparation or a cell reselection preparation is not satisfied, the UE may not refer to the present measurement criterion, and may start measuring all neighbor frequencies configured by a serving cell. Here, no matter whether DRX cycles are configured for the UE, the UE may perform the same behaviors as mentioned above.

On the other hand, configuring dedicated measurement for rapid CA configuration for UE in the idle state may affect the power consumption performance of the UE. For example, when priority of a configured dedicated measurement frequency in system information is lower, the UE is very unlikely to start measurement for the frequency based on a present measurement. In addition, camping time of the UE in the idle state is unpredictable, namely time when the UE is switched from the idle state to the connected state cannot be determined when the connection is released. If the UE is not needed to establish or resume a RRC connection in a long time, this part of dedicated configuration may be unavailable for network, and may cause additional power consumption of the UE. It is to be noted that the above descriptions about UE in the idle state are also suitable for UE in the inactive state, and elaborations are omitted herein.

The embodiments of the disclosure propose the following technical solutions. A terminal may perform cell selection or cell reselection rapidly, and the power consumption of the terminal may be reduced.

FIG. 8 is a first flowchart of a measurement method for a terminal according to an embodiment of the disclosure. As shown in FIG. 8, the measurement method for a terminal includes the following step.

In 801, a terminal acquires first indication information, the first indication information being for determining a measurement parameter of a dedicated measurement frequency, the measurement parameter of the dedicated measurement frequency being a first measurement parameter and/or a second measurement parameter, and the first measurement parameter being greater than the second measurement parameter.

In the embodiment of the disclosure, the terminal may be any device capable of communicating with a network, such as a mobile phone, a tablet computer, a notebook computer, a vehicle terminal, and a wearable device.

In the embodiment of the disclosure, the terminal may be in an idle state or an inactive state.

In the embodiment of the disclosure, the terminal may receive the first indication information in the following manners.

A first manner: the first indication information is configured by a network side through RRC dedicated signaling.

Based on this, the terminal may receive RRC dedicated signaling from a base station, and acquire the first indication information through the RRC dedicated signaling.

Here, the RRC dedicated signaling may be, for example, an RRC release message.

A second manner: the first indication information is configured by the network side through SIB signaling.

Based on this, the terminal may receive SIB signaling from the base station, and acquire the first indication information through the SIB signaling.

Here, the SIB signaling may be, for example, SIBS signaling.

A third manner: the first indication information is configured in a protocol.

Based on this, the terminal may acquire the first indication information according to the protocol.

In the embodiment of the disclosure, the network side may configure measurement parameters for dedicated measurement frequencies (for example, DC/CA frequencies) of one or more terminals in a certain serving cell through RRC dedicated signaling or SIB signaling.

It is to be noted that the number of the dedicated measurement frequencies may be one or more. For a certain dedicated measurement frequency, the measurement parameter of the dedicated measurement frequency is a first measurement parameter or a second measurement parameter. For multiple dedicated measurement frequencies, all the measurement parameters for the multiple dedicated measurement frequencies may be first measurement parameters or second measurement parameters, or part of the measurement parameters are first measurement parameters while the other part are second measurement parameters.

In the embodiment of the disclosure, the first indication information may be included in measurement configuration information. Furthermore, the measurement configuration information may include a dedicated measurement frequency list, and the first indication information may be included in the dedicated measurement frequency list. Furthermore, the dedicated measurement frequency list includes a DC frequency list or a CA frequency list.

Referring to FIG. 9A, measurement configuration information (MeasConfigSIB) in the SIB signaling includes the dedicated measurement frequency list (measCarrierList), and measurement configuration information (MeasConfigDedicated) in the RRC dedicated signaling includes measCarrierList and a validity duration (measDuration). Furthermore, measCarrierList includes carrierFreq, allowedMeasBandwidth, validityArea, reportQuantities, qualityThreshold, etc. carrierFreq and allowedMeasBandwidth indicate a measurement frequency and a measurement bandwidth, and validityArea indicates a validity range of the measurement configuration, and is a cell list. The measCellList presents cells reported by the measurement configuration, and other cells are not required to be reported. If measCellList is not configured, the UE reports measurement of maxCellMeasIdle cells meeting qualityThreshold. Reported measurements are specified by reportQuantities.

In the solution, measCarrierList is configured to implement CA or DC rapidly.

It is to be noted that, for the idle state, MeasConfigSIB may be represented as MeasIdleConfigSIB, measCarrierList may be represented as measIdleCarrierList, MeasConfigDedicated may be represented as MeasIdleConfigDedicated, and measDuration may be represented as measIdleDuration. For the inactive state, MeasConfigSIB may be represented as MeasInactiveConfigSIB, measCarrierList may be represented as measInactiveCarrierList, MeasConfigDedicated may be represented as MeasInactiveConfigDedicated, and measDuration may be represented as measInactiveDuration.

It is to be noted that measCarrierList may be applied to EUTRA (represented as measCarrierListEUTRA), and may also be applied to NR (represented as measCarrierListEUTRA).

In an implementation mode, the first indication information may be included in measConfigDedicated, and furthermore, the first indication information may be included in measCarrierList in measConfigDedicated.

In another implementation mode, the first indication information may be included in MeasConfigSIB, and furthermore, the first indication information may be included in measCarrierList in MeasConfigSIB.

Referring to FIG. 9B, the first indication information (Relaxed requirement indicator) may be added in measCarrierList based on FIG. 9A in FIG. 9B. It is to be noted that the first indication information (Relaxed requirement indicator) may be added in Information Element (IE) measCarrierList in the example shown in FIG. 9B, but the technical solution of the embodiment of the disclosure is not limited thereto. For example, an IE may be added in measConfigDedicated or MeasConfigSIB, a content of the newly added IE is the first indication information (Relaxed requirement indicator), and the newly added IE is independent of IE measCarrierList. Furthermore, the first indication information is for determining the measurement parameter of the dedicated measurement frequency, the measurement parameter of the dedicated measurement frequency is the first measurement parameter and/or the second measurement parameter, and the first measurement parameter is greater than the second measurement parameter. Here, the first measurement parameter may also be represented as a relaxed measurement parameter (or called a relaxed requirement), the second measurement parameter may also be represented as a normal measurement parameter (or called a normal requirement), and the normal measurement parameter is relaxed to obtain the relaxed measurement parameter. Here, relaxing refers to increasing the normal measurement parameter. Furthermore, the first indication information includes at least one of a first indicator, a second indicator, or a third indicator.

1) The first indicator: the first indicator is for indicating the first measurement parameter or the second measurement parameter.

For example, whether to use the first measurement parameter or the second measurement parameter is indicated by 1 bit. For example, when a value of 1 bit is 0, it indicates that the second measurement parameter (i.e., the normal measurement parameter) is used; and when the value of 1 bit is 1, it indicates that the first measurement parameter (i.e., the relaxed measurement parameter) is used.

2) The second indicator: the second indicator is for indicating a scaling factor of the first measurement parameter.

Based on this, the terminal may determine the first measurement parameter based on the second measurement parameter and the scaling factor of the first measurement parameter.

Furthermore, different measurement parameters may share the same scaling factor. Or, different measurement parameters may correspond to independent scaling factors. Or, part of measurement parameters may share the same scaling factor, and measurement parameters other than the part of measurement parameters may correspond to independent scaling factors.

Furthermore, the scaling factor may include one scaling parameter or multiple scaling parameters.

During specific implementation, the second indicator may include an integer, and the integer is configured as the scaling factor corresponding to the first measurement parameter. When the integer is a default value, the second measurement parameter is used.

3) The third indicator: the third indicator is for indicating index information of the first measurement parameter.

For example, the index information of the first measurement parameter may be indicated by 2 bit.

4) Under the condition that the first indication information is a default value, the terminal determines the measurement parameter of the dedicated measurement frequency based on a protocol configuration.

In the embodiment of the disclosure, a relationship between a measurement frequency and a frequency of a serving cell is divided into:

Measurement and evaluation of serving cell;
Measurements of intra-frequency cells;
Measurements of inter-frequency cells; and
Measurements of inter-RAT cells.

Based on this, the measurement parameter may be divided as follows according to a relationship between a measurement frequency and a frequency of a serving cell.

1) The first measurement parameter includes at least one of following parameters: a measurement parameter of intra-frequency measurement, a measurement parameter of inter-frequency measurement, or a measurement parameter of inter-RAT measurement.

2) The second measurement parameter includes at least one of following parameters: a measurement parameter of intra-frequency measurement, a measurement parameter of inter-frequency measurement, or a measurement parameter of inter-RAT measurement.

In the solution, the first measurement parameter may include at least one of following parameters: detection duration (Tdetect), measurement duration (Tmeasure), or evaluation duration (Tevaluate). Similarly, the second measurement parameter may include at least one of following parameters: detection duration (Tdetect), measurement duration (Tmeasure), or evaluation duration (Tevaluate). Definitions about Tdetect, Tmeasure, and Tevaluate are as shown in FIG. 7, and will not be elaborated herein.

In the embodiment of the disclosure, the terminal may determine a measurement parameter of a target frequency based on the first indication information. How to determine the measurement parameter of the target frequency will be described below in combination with different target frequencies.

1) For a high-priority target frequency, a measurement parameter of the target frequency is the second measurement parameter, the high-priority target frequency being a frequency with a higher priority than a frequency of a serving cell.

Furthermore, for the high-priority target frequency, when the target frequency is a dedicated measurement frequency, the measurement parameter of the target frequency is the second measurement parameter; or, furthermore, for the high-priority target frequency, when the target frequency is not a dedicated measurement frequency, the measurement parameter of the target frequency is the second measurement parameter.

Here, the high-priority target frequency may be a frequency for which measurement is started.

2) For a high-priority target frequency, when the target frequency is not a dedicated measurement frequency, the measurement parameter of the target frequency is a measurement parameter determined based on the first indication information or a measurement parameter determined based on second indication information, the second indication information being for determining the measurement parameter of the target frequency, and the high-priority target frequency being a frequency with a higher priority than a frequency of a serving cell.

Here, the high-priority target frequency may be a frequency for which measurement is started.

3) For an equivalent-priority or low-priority target frequency, when the target frequency is a dedicated measurement frequency, a measurement parameter of the target frequency is the measurement parameter determined based on the first indication information, the equivalent-priority or low-priority target frequency being a frequency having a priority not higher than a frequency of a serving cell.

Here, the equivalent-priority or low-priority target frequency may be a target frequency for which no measurement is started.

4) For an equivalent-priority or low-priority target frequency, when the target frequency is not a dedicated measurement frequency, measurement for the target frequency is not started, the equivalent-priority or low-priority target frequency being a frequency having a priority not higher than a frequency of a serving cell.

Figure 10:
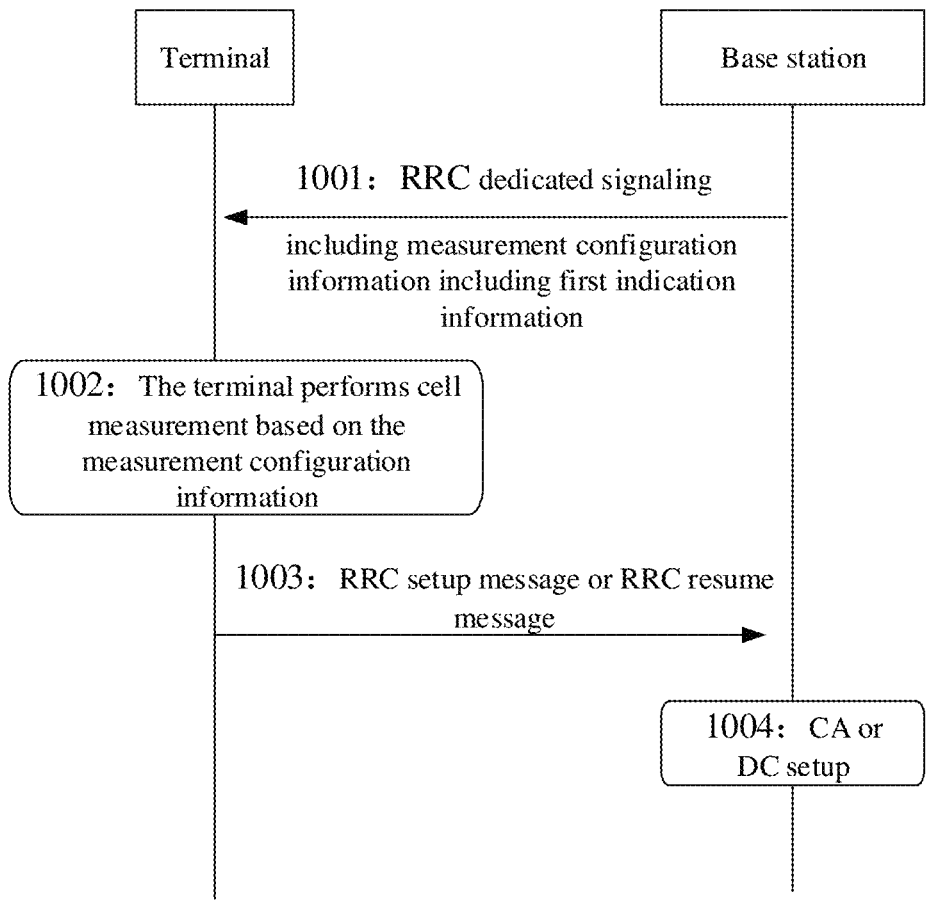
FIG. 10 is a second flowchart of a measurement method for a terminal according to an embodiment of the disclosure.

FIG. 10 is a second flowchart of a measurement method for a terminal according to an embodiment of the disclosure. As shown in FIG. 10, the measurement method for a terminal includes the following steps.

In 1001, a base station sends RRC dedicated signaling to a terminal, the RRC dedicated signaling including measurement configuration information, and the measurement configuration information including first indication information.

Here, the first indication information is for determining a measurement parameter of a dedicated measurement frequency (a CA or DC frequency), and the measurement parameter of the dedicated measurement frequency is a relaxed measurement parameter or a normal measurement parameter.

In an implementation mode, the RRC dedicated signaling may be an RRC release message, and in such case, the terminal may enter an idle state after receiving the RRC release message.

In another implementation mode, the RRC dedicated signaling may be a Release with suspend message, and in such case, the terminal may enter an inactive state after receiving the Release with suspend message.

In 1002, the terminal performs cell measurement based on the measurement configuration information.

Here, cell measurement may include measurement for a dedicated measurement frequency.

In 1003, the terminal sends an RRC setup message or an RRC resume message to the base station.

Here, the terminal may send the RRC setup message to the base station when the terminal receives the RRC release message. The terminal may send the RRC resume message to the base station in response to receiving the Release with suspend message.

In 1004, the base station performs CA or DC setup.

In the embodiment of the disclosure, the terminal may receive dedicated measurement configuration information of a network side through the RRC release message (or the Release with suspend message), and keep the measurement configuration information after returning to the idle state (or the inactive state). In a process of performing neighboring-cell measurement based on a cell reselection frequency priority mechanism, for frequencies (such as low-priority frequencies) that the terminal in the idle state (or the inactive state) expects to establish in a DC or CA connection and do not satisfy neighboring-cell measurement parameters, one or more sets of measurement parameters different from those of frequencies (such as high-priority frequencies) that are expected frequencies and also satisfy the neighboring-cell measurement parameters are defined and used to make it possible to perform measurement detection of neighboring-cell frequencies (from a dedicated signaling configuration or SIB configuration when the connection is released). In addition, the new measurement parameters may ensure a smaller measurement count and lower power consumption. The UE may report a measurement result to achieve purposes of reducing neighboring-cell measurement after state switching and rapidly establishing a CA/DC connection.

The technical solution of the embodiment of the disclosure will be described below in combination with specific application examples.

A First Application Example

A frequency of a serving cell is f1.

Frequencies that UE needs to measure in an idle state or an inactive state are {f1, . . . , f5}.

Here, a relationship between frequencies that UE needs to measure may include at least one of the following relationships: intra-frequency, inter-frequency, and inter-RAT.

Dedicated frequencies (CA or DC frequencies) are {f1, f2, f3}.

Here, measCarrierList in measurement configuration information may include these frequencies, and specific UE1 is notified.

Figure 11:
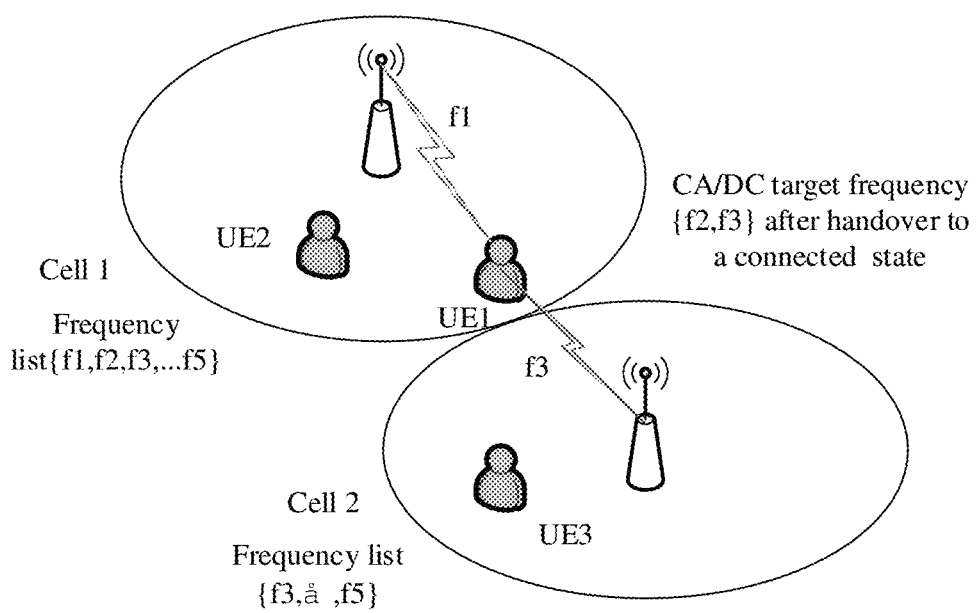
FIG. 11 is a schematic scenario diagram of a first application example according to an embodiment of the disclosure.

Referring to FIG. 11, for UE1 in a serving cell (Serving cell: f1), measurement is performed according to a cell reselection measurement priority criterion. When frequency priorities of {f3, f4} are higher than that of f1, the UE may keep starting measurement for the frequencies {f3, f4}. When priorities of {f2, f5} are lower than that of f1, and an RSRP value of the serving cell is greater than SnonIntraSearchP, measurement for the frequencies f2 and f5 is not started. In the embodiment of the disclosure, measurement priorities are not changed, and different measurement parameters are used for frequencies with different priorities.

For a high-priority frequency (such as f3) for which measurement is started based on a cell reselection criterion, a normal measurement parameter is used.

For a low-priority frequency (such as f2) for which no measurement is started based on the cell reselection criterion and which is a target frequency, relaxed measurement parameter 1 is used, which relaxes a measurement duration compared with a normal measurement parameter.

For a high-priority frequency (such as f4) for which measurement is started based on the cell reselection criterion and which is not a target frequency, the normal measurement parameter is used, or relaxed measurement parameter 2 is used.

For a frequency (such as f5) that has another low priority and is not a target frequency as well as for which measurement is not started based on the cell reselection criterion, measurement is not started.

If a measurement parameter corresponding to a normal measurement parameter includes N0 cycles, and a measurement parameter corresponding to a relaxed measurement parameter includes N1 cycles, N1>N0.

In addition, the solution is also applied to other UE, such as UE2, in a serving cell.

A system of the embodiment of the disclosure includes, but not limited to:

an E-UTRA system, a cycle being correspondingly a DRX cycle; and an NR system, a cycle being correspondingly an extended DRX (eDRX) cycle.

A Second Application Example

Measurement parameters are configured in form of a table through a protocol. Specifically, the measurement parameters are constants. It is to be noted that intra-frequency is taken as an example, and the solution in the example is also applied to inter-frequency and inter-RAT.

Table 1 corresponds to normal measurement parameters (normal requirements). Table 2 corresponds to relaxed measurement parameters (relaxed requirements). Comparison between Table 2 and Table 1 shows that the measurement parameters (such as Tdetect,EUTRAN_Intra, Tmeasure,EU-TRAN_Intra, and Tevaluate,E-UTRAN_intra) are increased in Table 2.

TABLE 1

| DRX cycle length [s] | $T_{detect,}$ $EUTRAN\_Intra$ [s] (number of DRX cycles) | $T_{measure, EUTRAN\_Intra}$ [s] (number of DRX cycles) | $T_{evaluate,}$ $E\text{-}UTRAN\_intra$ [s] (number of DRX cycles) |
|---|---|---|---|
| 0.32 | 11.52 (36) | 1.28 (4) | 5.12 (16) |
| 0.64 | 17.92 (28) | 1.28 (2) | 5.12 (8) |
| 1.28 | 32 (25) | 1.28 (1) | 6.4 (5) |
| 2.56 | 58.88 (23) | 2.56 (1) | 7.68 (3) |

TABLE 2

| DRX cycle length [s] | $T_{detect,}$ $EUTRAN\_Intra$ [s] (number of DRX cycles) | $T_{measure, EUTRAN\_Intra}$ [s] (number of DRX cycles) | $T_{evaluate,}$ $E\text{-}UTRAN\_intra$ [s] (number of DRX cycles) |
|---|---|---|---|
| 0.32 | 12.8 (40) | 1.92 (6) | 5.78(18) |
| 0.64 | . . . | . . . | . . . |
| 1.28 | . . . | . . . | . . . |
| 2.56 | . . . | . . . | . . . |

A Third Application Example

A network side configures measurement parameters for a DC/CA frequency list of UE1 in a serving cell through RRC dedicated signaling. Or, the network side configures measurement parameters for a DC/CA frequency list of all UEs in a serving cell through SIB signaling. Here, a difference between the SIB signaling and the RRC dedicated signaling is that the DC/CA frequency list configured through the SIB signaling is oriented to all the UEs in the cell and applied to all the UEs. It is to be noted that intra-frequency is taken as an example, and the solution in the example is also applied to inter-frequency and inter-RAT.

A scaling factor included in first indication information includes one scaling parameter, namely the scaling parameter is multiplied based on a measurement parameter that is a normal requirement to obtain a measurement parameter that is a relaxed requirement. Table 3 is taken as an example.

S1, S2, . . . may be unified numerical values, namely the configuration signaling is independent of DRX cycles and includes only one IE. S1, S2, . . . may also be different, namely the configuration signaling includes different or the same IE corresponding to different DRX cycles.

TABLE 3

| DRX cycle length [s] | $T_{detect, EUTRAN\_Intra}$ [s] (number of DRX cycles) | $T_{measure, EUTRAN\_Intra}$ [s] (number of DRX cycles) | $T_{evaluate, E-UTRAN\_intra}$ [s] (number of DRX cycles) | Scaling Factor |
|---|---|---|---|---|
| 0.32 | 11.52 (36) | 1.28 (4) | 5.12 (16) | S1 |
| 0.64 | 17.92 (28) | 1.28 (2) | 5.12 (8) | S2 |
| 1.28 | 32 (25) | 1.28 (1) | 6.4 (5) | S3 |
| 2.56 | 58.88 (23) | 2.56 (1) | 7.68 (3) | S4 |

The scaling factor included in the first indication information includes multiple scaling parameters N, M, . . . , namely N, M, . . . are multiplied based on measurement parameters that are normal requirements to obtain measurement parameters that are relaxed requirements.

TABLE 4

| DRX cycle length [s] | $T_{detect, EUTRAN\_Intra}$ [s] (number of DRX cycles) | $T_{measure, EUTRAN\_Intra}$ [s] (number of DRX cycles) | $T_{evaluate, E-UTRAN\_intra}$ [s] (number of DRX cycles) |
|---|---|---|---|
| 0.32 | 11.52 (36) × N × M | 1.28 (4) × N × M | 5.12 (16) × N × M |
| 0.64 | 17.92 (28) × N | 1.28 (2) × N | 5.12 (8) × N |
| 1.28 | . . . | . . . | . . . |
| 2.56 | . . . | . . . | . . . |

The scaling factor included in the first indication information includes one scaling parameter, namely the scaling parameter is added based on a measurement parameter that is a normal requirement to obtain a measurement parameter that is a relaxed requirement.

The scaling factor included in the first indication information includes multiple scaling parameters N, M, . . . , namely N, M, . . . are added based on measurement parameters that are normal requirements to obtain a measurement parameter that is a relaxed requirement.

The parameter is configured as a combination of the above parameters.

Furthermore, an effect of adding weighting of scaling parameters considering different frequency ranges is shown in Table 5.

TABLE 5

| DRXcycle length [s] | Scaling Factor (N1) | | $T_{detect, NR\_Intra}$ [s] (number of DRX cycles) | $T_{measure, NR\_Intra}$ [s] (number of DRX cycles) | $T_{evaluate, NR\_Intra}$ [s] (number of DRX cycles) |
|---|---|---|---|---|---|
| | FR1 | FR2[Note1] | | | |
| 0.32 | S1 | S2 | 11.52 × N1 × M2 (36 × N1 × M2) | 1.28 × N1 × M2 (4 × N1 × M2) | 5.12 × N1 × M2 (16 × N1 × M2) |
| 0.64 | | S3 | 17.92 × N1 (28 × N1) | 1.28 × N1 (2 × N1) | 5.12 × N1 (8 × N1) |

Note1:
the application scope of N1/M2 may be specified in the table.

In the technical solution of the embodiment of the disclosure, A) the first indication information (or the measurement configuration information including the first indication information) may also be acquired through other pre-configuration information, such as a cell frequency list reserved when UE releases a connection, or a frequency combination determined by the UE or a network by default. B) The technical solution of the embodiment of the disclosure is applied to an un-license system, such as NR-Unlicensed (NR-U) and License Assisted Access (LAA). C) Different cycles may be configured for a dedicated frequency list. Both the methods of pre-configuration in a protocol or configuration through RRC dedicated signaling may be supported, namely several sets of tables or scaling parameters of different relaxed levels are configured. An embodiment of the disclosure provides a method for optimizing measurement of UE in the idle state/inactive state. Different measurement parameters are used for different frequencies, dedicated frequencies (CA or DC frequencies) may be indicated by pre-configuration or RRC dedicated signaling or SIB signaling, measurement duration and cycles of the UE in the idle state/inactive state for different frequencies may be regulated flexibly, effective measurement results may be reported and provided for the network side, and the network side may configure and activate CA or DC rapidly. The power loss of the UE in the idle state and the inactive state can be reduced at the same time of ensuring the mobility of the terminal.

Figure 12:
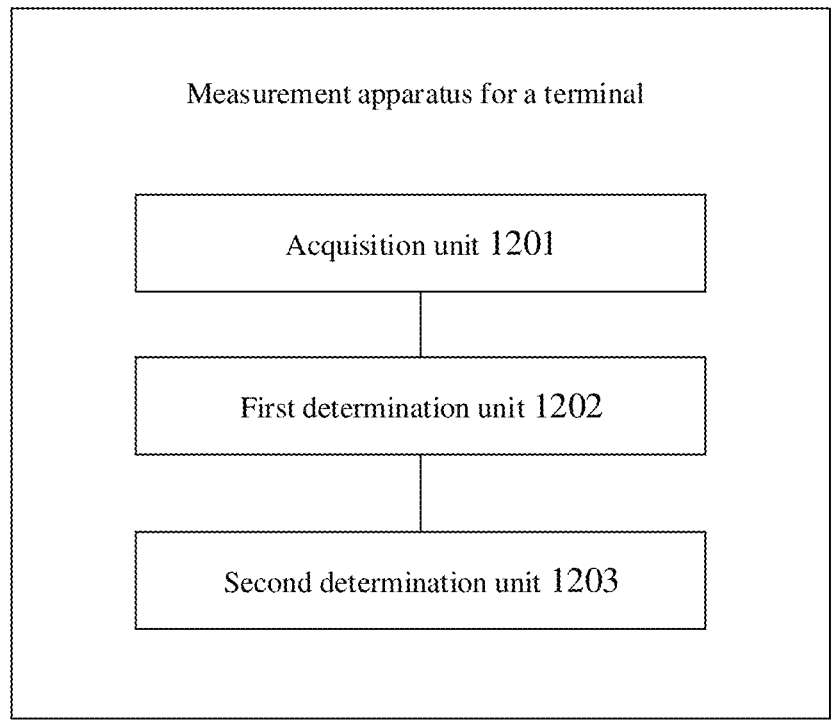
FIG. 12 is a structure composition diagram of a measurement apparatus for a terminal according to an embodiment of the disclosure.

FIG. 12 is a structure composition diagram of a measurement apparatus for a terminal according to an embodiment of the disclosure. As shown in FIG. 12, the measurement apparatus includes an acquisition unit 1201.

The acquisition unit 1201 is configured to acquire first indication information, the first indication information being for determining a measurement parameter of a dedicated measurement frequency, the measurement parameter of the dedicated measurement frequency being a first measurement parameter and/or a second measurement parameter, and the first measurement parameter being greater than the second measurement parameter.

In an implementation mode, the first indication information may be configured by a network side through RRC dedicated signaling; or, the first indication information may be configured by the network side through SIB signaling; or, the first indication information may be configured in a protocol.

In an implementation mode, the first indication information may be included in measurement configuration information.

In an implementation mode, the measurement configuration information may include a dedicated measurement frequency list, and the first indication information may be included in the dedicated measurement frequency list.

In an implementation mode, the dedicated measurement frequency list may include a DC frequency list or a CA frequency list.

In an implementation mode, the first indication information may include a first indicator, and the first indicator may be for indicating the first measurement parameter or the second measurement parameter.

In an implementation mode, the first indication information may include a second indicator, and the second indicator may be for indicating a scaling factor of the first measurement parameter.

In an implementation mode, the measurement apparatus may further include a first determination unit 1202 configured to determine the first measurement parameter based on the second measurement parameter and the scaling factor of the first measurement parameter.

In an implementation mode, different measurement parameters may share a same scaling factor; or, different measurement parameters may correspond to independent scaling factors; or, part of measurement parameters may share the same scaling factor, and measurement parameters other than the part of measurement parameters correspond to independent scaling factors.

In an implementation mode, the scaling factor may include one scaling parameter or multiple scaling parameters.

In an implementation mode, the first indication information may include a third indicator, and the third indicator may be for indicating index information of the first measurement parameter.

In an implementation mode, the first indication information may be a default value, the terminal may determine the measurement parameter of the dedicated measurement frequency based on a protocol configuration.

In an implementation mode, the first measurement parameter may include at least one of following parameters: a measurement parameter of intra-frequency measurement, a measurement parameter of inter-frequency measurement, or a measurement parameter of inter-RAT measurement.

In an implementation mode, the second measurement parameter may include at least one of following parameters: a measurement parameter of intra-frequency measurement, a measurement parameter of inter-frequency measurement, or a measurement parameter of inter-RAT measurement.

In an implementation mode, the first measurement parameter may include at least one of following parameters: detection duration, measurement duration, or evaluation duration.

The second measurement parameter may include at least one of following parameters: detection duration, measurement duration, or evaluation duration.

In an implementation mode, the measurement apparatus may further include a second determination unit 1203.

The second determination unit 1203 may be configured to determine a measurement parameter of a target frequency based on the first indication information.

In an implementation mode, the second determination unit 1203 may be configured to, for a high-priority target frequency for which measurement is started, determine that a measurement parameter of the target frequency is the second measurement parameter, the high-priority target frequency being a frequency with a higher priority than a frequency of a serving cell.

In an implementation mode, the second determination unit 1203 may be configured to, when the high-priority target frequency is the dedicated measurement frequency, determine that the measurement parameter of the target frequency is the second measurement parameter; or, when the high-priority target frequency is not the dedicated measurement frequency, determine that the measurement parameter of the high-priority target frequency is the second measurement parameter.

In an implementation mode, the second determination unit 1203 may be configured to, for a high-priority target frequency, when the high-priority target frequency is not the dedicated measurement frequency, determine that a measurement parameter of the high-priority target frequency is determined based on the first indication information or the second indication information, the second indication information being for determining the measurement parameter of the high-priority target frequency, and the high-priority target frequency being a frequency with a higher priority than a frequency of a serving cell.

In an implementation mode, the high-priority target frequency may be a frequency for which measurement is started.

In an implementation mode, the second determination unit 1203 may be configured to, for an equivalent-priority or low-priority target frequency, when the equivalent-priority or low-priority target frequency is the dedicated measurement frequency, determine that a measurement parameter of the equivalent-priority or low-priority target frequency is determined based on the first indication information, the equivalent-priority or low-priority target frequency being a frequency with a priority not higher than a frequency of a serving cell.

In an implementation mode, the equivalent-priority or low-priority target frequency may be a target frequency for which no measurement is started.

In an implementation mode, the second determination unit 1203 may be configured to, for an equivalent-priority or low-priority target frequency, when the equivalent-priority or low-priority target frequency is not the dedicated measurement frequency, determine not to start measurement for the target frequency, the equivalent-priority or low-priority target frequency being a frequency with a priority not higher than a frequency of a serving cell.

In an implementation mode, the terminal may be in an idle state or an inactive state.

It is understood by those skilled in the art that the related descriptions about the measurement apparatus for a terminal in the embodiments of the disclosure may be understood with reference to the related descriptions about the measurement method for a terminal in the embodiments of the disclosure.

Figure 13:
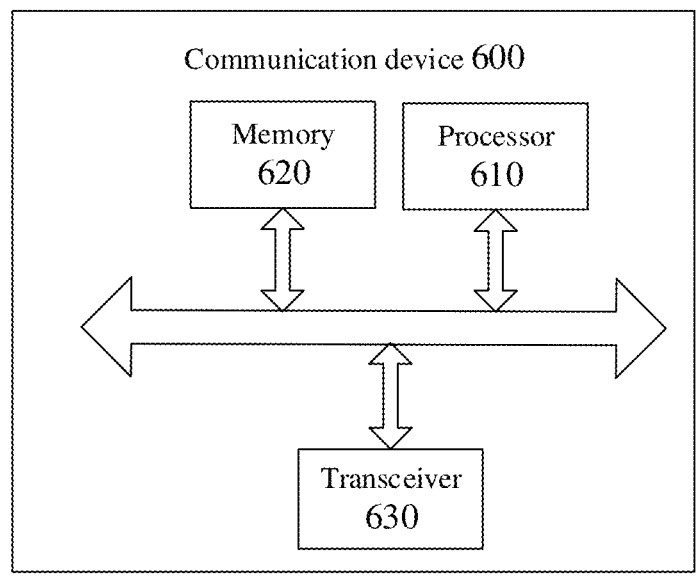
FIG. 13 is a schematic structure diagram of a communication device according to an embodiment of the disclosure.

FIG. 13 is a schematic structure diagram of a communication device 600 according to an embodiment of the disclosure. The communication device may be a terminal. The communication device 600 shown in FIG. 13 includes a processor 610, and the processor 610 may call and run a computer program in memory to implement the measurement method in the embodiments of the disclosure.

Optionally, as shown in FIG. 13, the communication device 600 may further include memory 620. The processor 610 may call and run the computer program in the memory 620 to implement the measurement method in the embodiments of the disclosure.

The memory 620 may be an independent device independent of the processor 610 and may also be integrated into the processor 610.

Optionally, as shown in FIG. 13, the communication device 600 may further include a transceiver 630, and the processor 610 may control the transceiver 630 to communicate with another device, specifically sending information or data to another device or receiving information or data sent by another device.

The transceiver 630 may include a transmitter and a receiver. The transceiver 630 may further include antennae. The number of the antennae may be one or more.

Optionally, the communication device 600 may specifically be the network device of the embodiments of the disclosure. The communication device 600 may implement corresponding flows implemented by the network device in each method of the embodiments of the disclosure. For simplicity, elaborations are omitted herein.

Optionally, the communication device 600 may specifically be the mobile terminal/terminal of the embodiments of the disclosure, and the communication device 600 may implement corresponding flows implemented by the mobile terminal/terminal in each method of the embodiments of the disclosure. For simplicity, elaborations are omitted herein.

Figure 14:
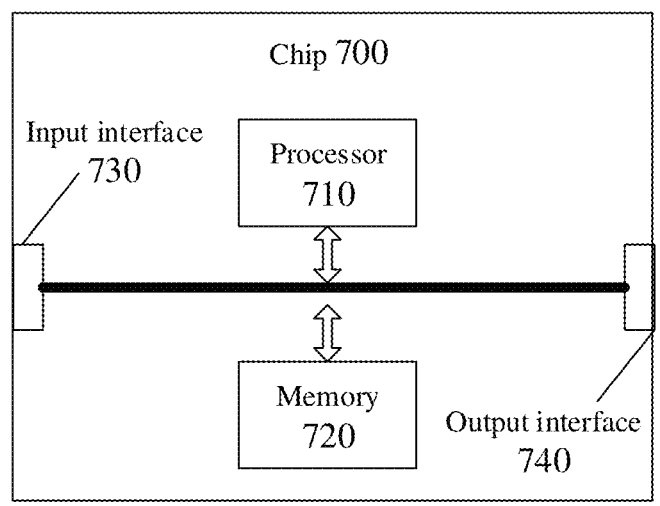
FIG. 14 is a schematic structure diagram of a chip according to another embodiment of the disclosure.

FIG. 14 is a schematic structure diagram of a chip according to another embodiment of the disclosure. The chip 700 shown in FIG. 14 includes a processor 710, and the processor 710 may call and run a computer program in a memory to implement the measurement method in the embodiments of the disclosure.

Optionally, as shown in FIG. 14, the chip 700 may further include memory 720. The processor 710 may call and run the computer program in the memory 720 to implement the measurement method in the embodiments of the disclosure.

The memory 720 may be an independent device independent of the processor 710 and may also be integrated into the processor 710.

Optionally, the chip 700 may further include an input interface 730. The processor 710 may control the input interface 730 to communicate with another device or chip, specifically acquiring information or data sent by another device or chip.

Optionally, the chip 700 may further include an output interface 740. The processor 710 may control the output interface 740 to communicate with another device or chip, specifically outputting information or data sent by another device or chip.

Optionally, the chip may be applied to the network device of the embodiments of the disclosure, and the chip may implement corresponding flows implemented by the network device in each method of the embodiments of the disclosure. For simplicity, elaborations are omitted herein.

Optionally, the chip may be applied to the mobile terminal/terminal of the embodiment of the disclosure, and the chip may implement corresponding flows implemented by the mobile terminal/terminal in each method of the embodiments of the disclosure. For simplicity, elaborations are omitted herein.

It is to be understood that the chip mentioned in the embodiment of the disclosure may also be called a system-level chip, a system chip, a chip system or a system on chip, etc.

Figure 15:
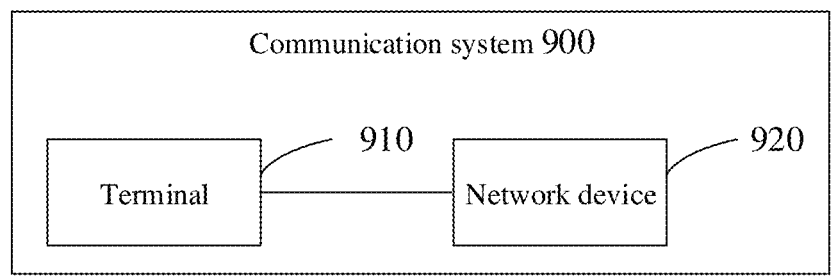
FIG. 15 is a schematic block diagram of a communication system according to an embodiment of the disclosure.

FIG. 15 is a second block diagram of a communication system 900 according to an embodiment of the disclosure. As shown in FIG. 15, the communication system 900 includes a terminal 910 and a network device 920.

The terminal 910 may be configured to realize corresponding functions realized by the terminal in the measurement method, and the network device 920 may be configured to realize corresponding functions realized by the network device in the measurement method. For simplicity, elaborations are omitted herein.

It is to be understood that the processor in the embodiment of the disclosure may be an integrated circuit chip and has a signal processing capacity. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logic device, discrete gate or transistor logic device and discrete hardware component. Each method, step and logical block diagram disclosed in the embodiments of the disclosure may be implemented or executed. The universal processor may be a microprocessor or the processor may also be any conventional processor, etc. The steps of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory and completes the steps of the method in combination with hardware.

It can be understood that the memory in the embodiment of the disclosure may be a volatile memory or a nonvolatile memory, or may include both the volatile and nonvolatile memories. The nonvolatile memory may be a ROM, a PROM, an EPROM, an EEPROM, or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM, and a DR RAM. That is, the memory in the embodiments of the disclosure is intended to include, but not limited to, memories of these and any other proper types.

The embodiments of the disclosure also provide a computer-readable storage medium, which is configured to store a computer program.

Optionally, the computer-readable storage medium may be applied to a network device in the embodiments of the disclosure, and the computer program enables a computer to execute corresponding flows implemented by the network device in each method of the embodiments of the disclosure. For simplicity, elaborations are omitted herein.

Optionally, the computer-readable storage medium may be applied to a mobile terminal/terminal in the embodiments of the disclosure, and the computer program enables a computer to execute corresponding flows implemented by the mobile terminal/terminal in each method of the embodiments of the disclosure. For simplicity, elaborations are omitted herein.

The embodiments of the disclosure also provide a computer program product, which includes a computer program instruction.

Optionally, the computer program product may be applied to a network device in the embodiments of the disclosure, and the computer program instruction enables a computer to execute corresponding flows implemented by the network device in each method of the embodiments of the disclosure. For simplicity, elaborations are omitted herein.

Optionally, the computer program product may be applied to a mobile terminal/terminal in the embodiments of the disclosure, and the computer program instruction enables the computer to execute corresponding flows implemented by the mobile terminal/terminal in each method of the embodiments of the disclosure. For simplicity, elaborations are omitted herein.

The embodiments of the disclosure also provide a computer program.

Optionally, the computer program may be applied to a network device in the embodiments of the disclosure, and the computer program runs in a computer to enable the computer to execute corresponding flows implemented by the network device in each method of the embodiments of the disclosure. For simplicity, elaborations are omitted herein.

Optionally, the computer program may be applied to a mobile terminal/terminal in the embodiments of the disclosure, and the computer program runs in the computer to enable the computer to execute corresponding flows implemented by the mobile terminal/terminal in each method of the embodiments of the disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed by hardware or software depends on specific disclosures and design constraints of the technical solutions. Professionals may realize the described functions for each specific disclosure by use of different methods, but such realization shall fall within the scope of the disclosure.

Those skilled in the art may clearly learn about that specific working processes of the system, apparatus and unit described above may refer to the corresponding processes in the method embodiment and will not be elaborated herein for convenient and brief description.

In some embodiments provided in the disclosure, it is to be understood that the disclosed system, apparatus and method may be implemented in another manner. For example, the apparatus embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the apparatus or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purposes of the solutions of the embodiments according to a practical requirement.

In addition, each function unit in each embodiment of the disclosure may be integrated into a processing unit, each unit may also physically exist independently, and two or more than two units may also be integrated into a unit.

When realized in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to cause a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A measurement method for a terminal, comprising:
acquiring, by the terminal, first indication information, wherein the first indication information is for determining a measurement parameter of a dedicated measurement frequency, the measurement parameter of the dedicated measurement frequency is at least one of a first measurement parameter or a second measurement parameter, and the first measurement parameter is greater than the second measurement parameter,
wherein the first measurement parameter is a relaxed measurement parameter obtained by amplifying the second measurement parameter,
wherein different measurement parameters are adopted for frequencies with different priorities,
the first measurement parameter comprises at least one of following parameters: detection duration, measurement duration, or evaluation duration, and
the second measurement parameter comprises at least one of following parameters: detection duration, measurement duration, or evaluation duration,
wherein the method further comprises:
for a high-priority target frequency, determining based on the first indication information that a measurement parameter of the high-priority target frequency is the second measurement parameter, the high-priority target frequency being a frequency with a higher priority than a frequency of a serving cell.

2. The measurement method of claim 1, further comprising:
   determining, by the terminal, the first measurement parameter based on the second measurement parameter and a scaling factor of the first measurement parameter.
3. The measurement method of claim 2, wherein
   different measurement parameters share a same scaling factor; or,
   different measurement parameters correspond to independent scaling factors; or,
   part of measurement parameters share the same scaling factor, and measurement parameters other than the part of measurement parameters correspond to independent scaling factors.
4. The measurement method of claim 2, wherein the first indication information comprises a second indicator, and the second indicator is used for indicating use of the scaling factor of the first measurement parameter.
5. The measurement method of claim 1, wherein
   the first measurement parameter comprises at least one of following parameters: a measurement parameter of intra-frequency measurement, a measurement parameter of inter-frequency measurement, or a measurement parameter of inter-Radio Access Technology (RAT) measurement; and
   the second measurement parameter comprises at least one of following parameters: a measurement parameter of intra-frequency measurement, a measurement parameter of inter-frequency measurement, or a measurement parameter of inter-RAT measurement.
6. The measurement method of claim 1, wherein determining that the measurement parameter of the target frequency is the second measurement parameter of the high-priority target frequency comprises:
   when the high-priority target frequency is not the dedicated measurement frequency, determining that the measurement parameter of the target frequency is the second measurement parameter.
7. The measurement method of claim 1, wherein the terminal is in an idle state or an inactive state.
8. A measurement method for a terminal, comprising:
   sending, by a network device, first indication information to the terminal,
   wherein the first indication information is configured to determine a measurement parameter of a dedicated measurement frequency, the measurement parameter of the dedicated measurement frequency is at least one of a first measurement parameter or a second measurement parameter, and the first measurement parameter is greater than the second measurement parameter,
   wherein the first measurement parameter is a relaxed measurement parameter obtained by amplifying the second measurement parameter,
   wherein different measurement parameters are adopted for frequencies with different priorities,
   the first measurement parameter comprises at least one of following parameters: detection duration, measurement duration, or evaluation duration, and
   the second measurement parameter comprises at least one of following parameters: detection duration, measurement duration, or evaluation duration,
   wherein for a high-priority target frequency, a measurement parameter of the high-priority target frequency is determined to be the second measurement parameter, the high-priority target frequency being a frequency with a higher priority than a frequency of a serving cell.

9. The measurement method of claim 8, wherein
   the first indication information is configured by the network device through Radio Resource Control (RRC) dedicated signaling; or,
   the first indication information is configured by the network device through System Information Block (SIB) signaling; or,
   the first indication information is configured in a protocol.
10. The measurement method of claim 8, further comprising:
    determining, by the network device, the first measurement parameter based on the second measurement parameter and a scaling factor of the first measurement parameter.
11. The measurement method of claim 10, wherein
    different measurement parameters share a same scaling factor; or,
    different measurement parameters correspond to independent scaling factors; or,
    part of measurement parameters share the same scaling factor, and measurement parameters other than the part of measurement parameters correspond to independent scaling factors.
12. The measurement method of claim 8, wherein
    the first measurement parameter comprises at least one of following parameters: a measurement parameter of intra-frequency measurement, a measurement parameter of inter-frequency measurement, or a measurement parameter of inter-Radio Access Technology (RAT) measurement; and
    the second measurement parameter comprises at least one of following parameters: a measurement parameter of intra-frequency measurement, a measurement parameter of inter-frequency measurement, or a measurement parameter of inter-RAT measurement.
13. The measurement method of claim 8, wherein
    when the high-priority target frequency is not the dedicated measurement frequency, the measurement parameter of the target frequency is determined to be the second measurement parameter.
14. A network device, comprising a transceiver,
    wherein the transceiver is configured to send first indication information to a terminal, wherein the first indication information is configured to determine a measurement parameter of a dedicated measurement frequency, the measurement parameter of the dedicated measurement frequency is at least one of a first measurement parameter or a second measurement parameter, and the first measurement parameter is greater than the second measurement parameter,
    wherein the first measurement parameter is a relaxed measurement parameter obtained by amplifying the second measurement parameter,
    wherein different measurement parameters are adopted for frequencies with different priorities,
    the first measurement parameter comprises at least one of following parameters: detection duration, measurement duration, or evaluation duration, and
    the second measurement parameter comprises at least one of following parameters: detection duration, measurement duration, or evaluation duration,
    wherein for a high-priority target frequency, a measurement parameter of the high-priority target frequency is determined to be the second measurement parameter, the high-priority target frequency being a frequency with a higher priority than a frequency of a serving cell.

* * * * *